(No Model.)  H. L. KIRTLEY.  6 Sheets—Sheet 2.
CIGAR VENDING MACHINE.

No. 529,276. Patented Nov. 13, 1894.

Witnesses:
Jas. E. Hutchinson
Thos. A. Green

Inventor:
Harry L. Kirtley,
By James L. Norris.
Attorney.

(No Model.)  6 Sheets—Sheet 3.

H. L. KIRTLEY.
CIGAR VENDING MACHINE.

No. 529,276.  Patented Nov. 13, 1894.

Witnesses:
Jas. E. Hutchinson.
Thos. A. Green

Inventor.
Harry L. Kirtley,
By James L. Norris.
Attorney.

(No Model.) 6 Sheets—Sheet 4.
H. L. KIRTLEY.
CIGAR VENDING MACHINE.

No. 529,276. Patented Nov. 13, 1894.

Witnesses:
Jas. E. Hutchinson
Thos. A. Green

Inventor.
Harry L. Kirtley,
By James L. Norris.
Attorney.

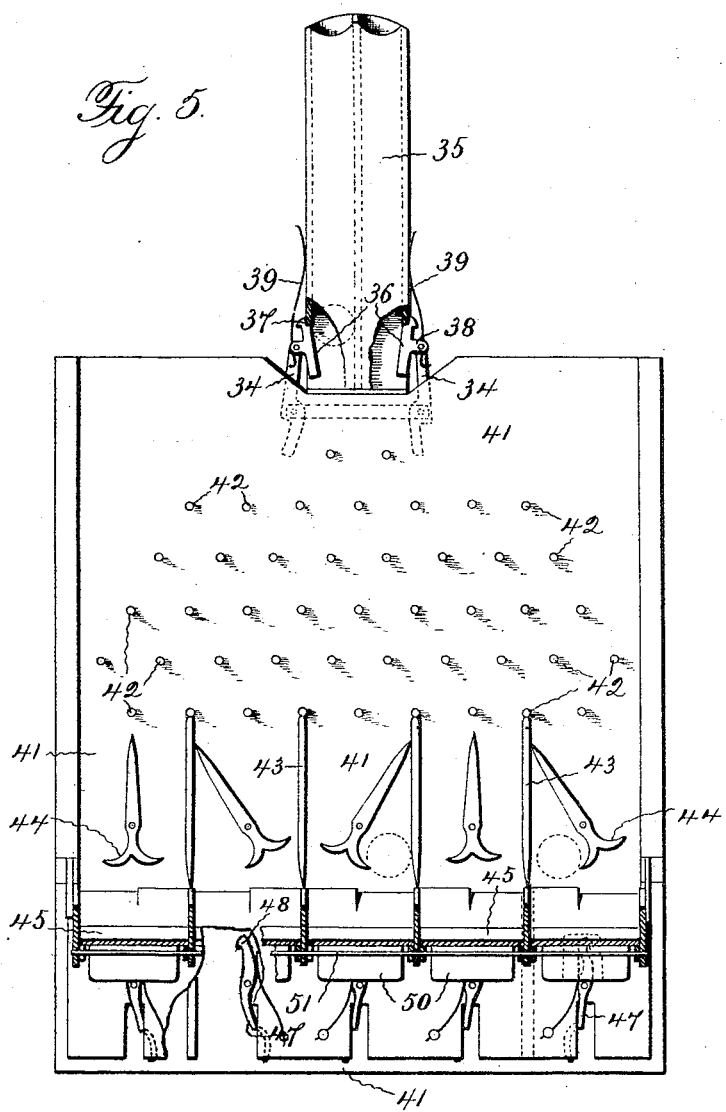

(No Model.)  H. L. KIRTLEY.  6 Sheets—Sheet 6.
CIGAR VENDING MACHINE.
No. 529,276.  Patented Nov. 13, 1894.
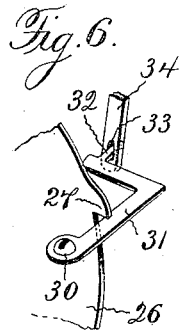
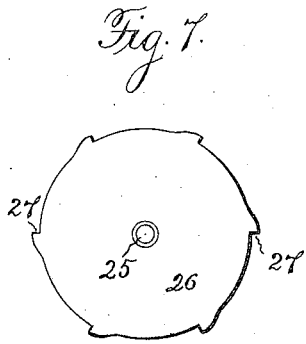
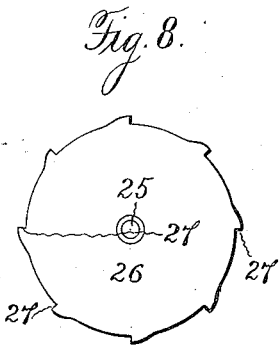
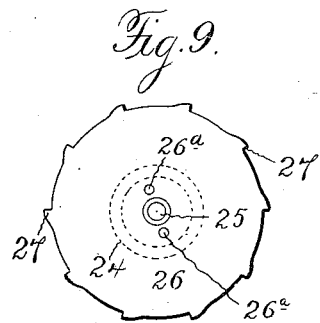
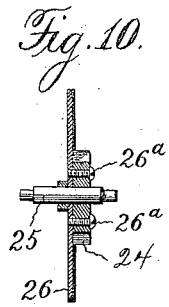
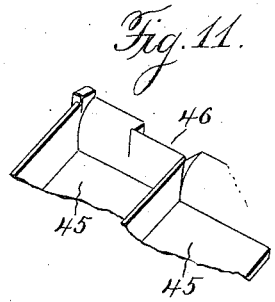
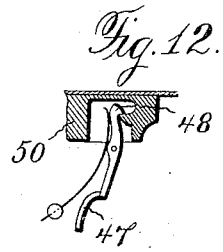
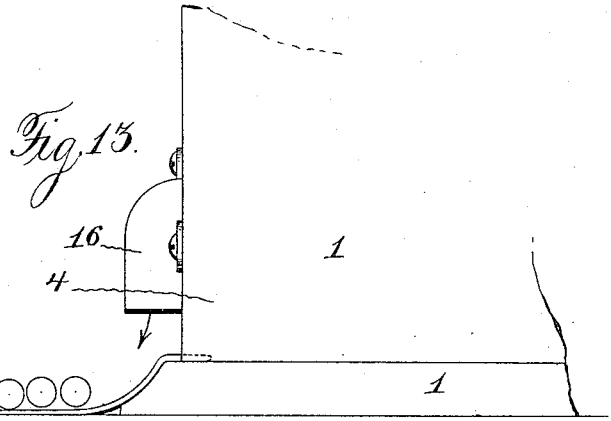
Witnesses:
Jas. E. Hutchinson.
Thos. A. Green.
Inventor.
Harry L. Kirtley,
By James L. Norris.
Attorney.
THE NORRIS PETERS CO., PHOTO-LITHO., WASHINGTON, D. C.

United States Patent Office.

HARRY L. KIRTLEY, OF HUNTINGTON, WEST VIRGINIA, ASSIGNOR, BY DIRECT AND MESNE ASSIGNMENTS, TO ROBERT E. VICKERS AND FRANK L. DOOLITTLE, OF SAME PLACE, AND JOHN F. KIRTLEY, OF SCAREY, WEST VIRGINIA.

CIGAR-VENDING MACHINE.

SPECIFICATION forming part of Letters Patent No. 529,276, dated November 13, 1894.

Application filed June 19, 1894. Serial No. 515,050. (No model.)

*To all whom it may concern:*

Be it known that I, HARRY L. KIRTLEY, a citizen of the United States, residing at Huntington, in the county of Cabell and State of West Virginia, have invented new and useful Improvements in Cigar-Vending Machines, of which the following is a specification.

My invention relates to coin-operated vending machines, and especially to that type of said machines employed in vending cigars.

It is my purpose to provide a cigar-vending machine having a plurality of independent, coin-receptacles, operated at suitable intervals by trapped coins for the purpose of dumping the contents of the receptacle operated at such a point that they shall be accessible; provision being made for the unequal distribution of the coins paid in among the several receptacles provided, and for the chance selection, by any one of the trapped coins, of the particular receptacle dumped.

The invention consists, to these ends in the novel features of construction and new combinations of parts hereinafter fully described and then particularly pointed out and defined in the claims.

To enable others to fully understand and to make and use my said invention, I will now describe the same in detail, reference being had to the accompanying drawings, in which—

Figure 1:
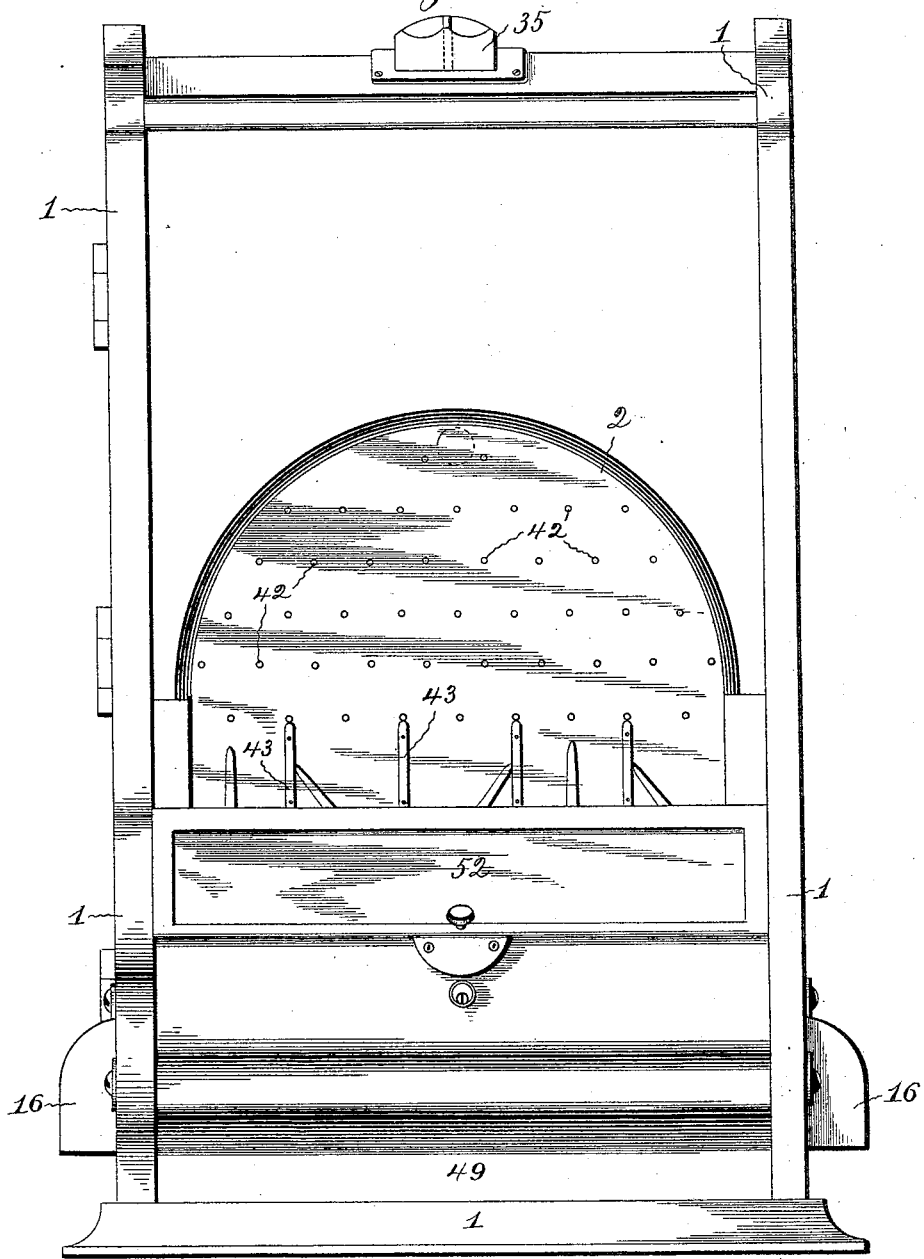
Figure 2:
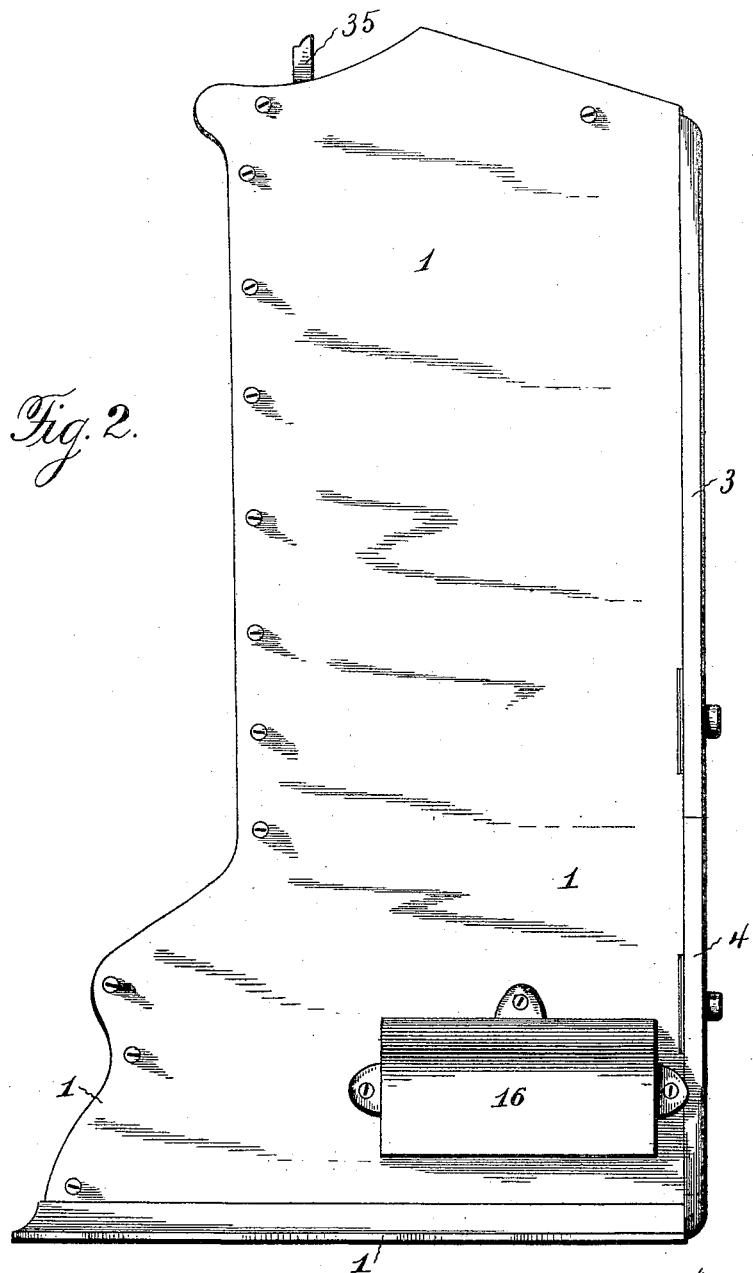
Figure 3:
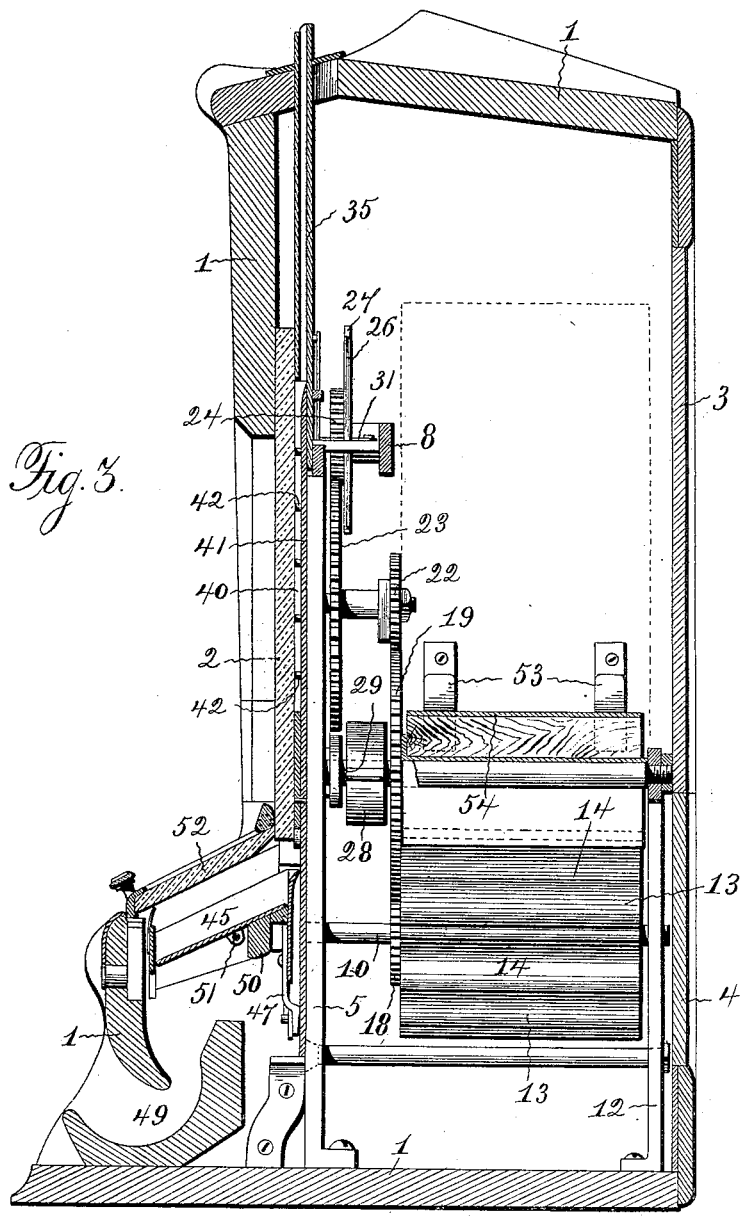
Figure 4:
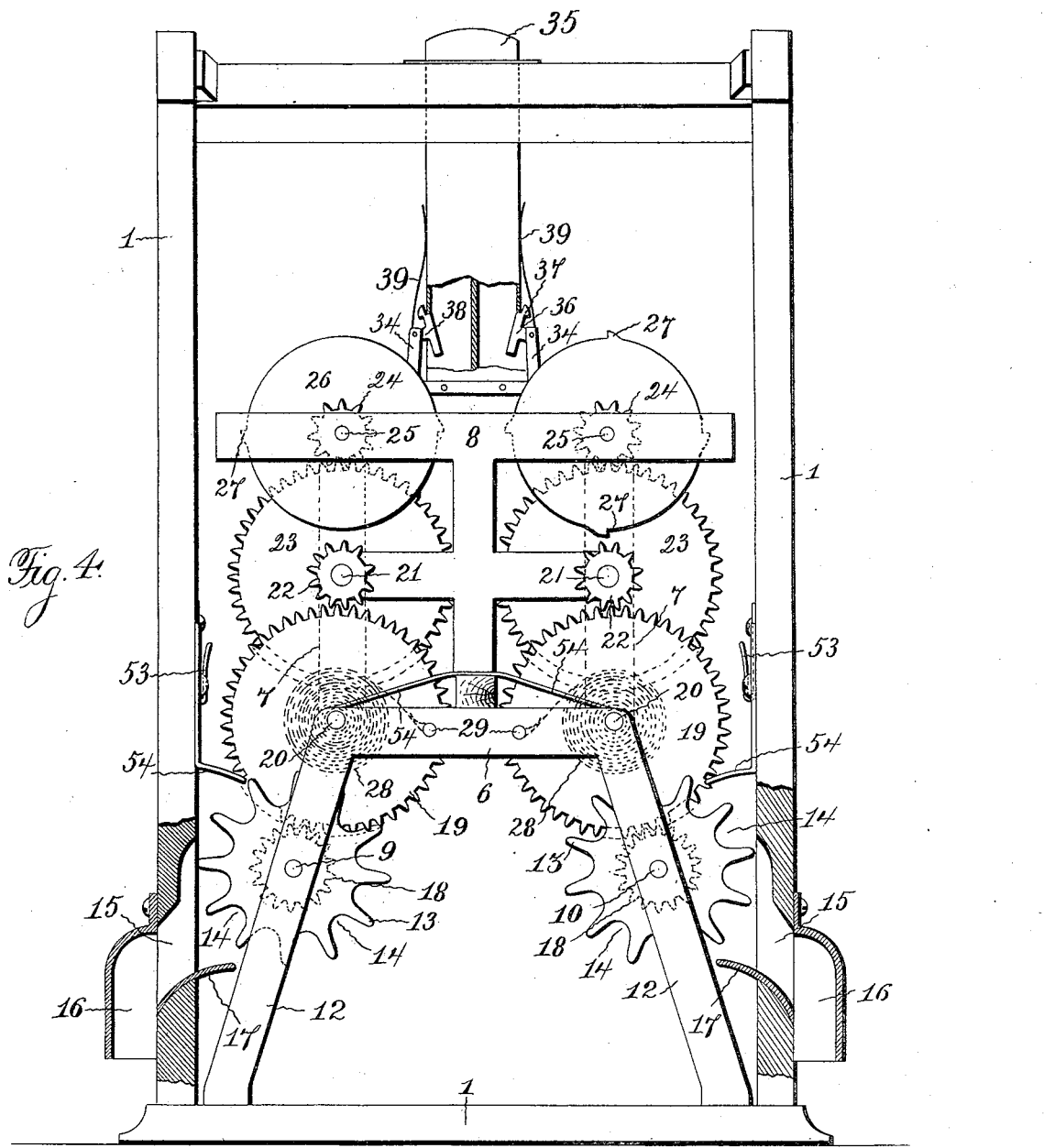

Figure 1 is a front elevation of a machine embodying my invention. Fig. 2 is a side elevation of the same. Fig. 3 is a vertical section, taken from front to rear, in the central line of the machine. Fig. 4 is a rear elevation, partly in section, showing the interior mechanism; the delivery-chutes at the sides being shown in section. Fig. 5 is a front elevation of the parts immediately in rear of the inclosing front wall of the casing, showing the coin-chutes, the coin operated releasing-levers, the coin-distributing pin-plate, the coin-receiving trays and the trapping devices. Fig. 6 is a detail perspective of part of one of the coin-operated, releasing-levers, the latch operated thereby, and part of the stop-disk, or wheel. Fig. 7 is a detail view of a stop-disk, showing the construction adopted in vending cigars costing fifteen cents each, or three times the cost of the cheapest quality vended by the machine. Fig. 8 is a similar view showing the form of stop-disk used in vending cigars selling for twenty cents each, or four times the lowest cost. Fig. 9 is a similar view showing a stop-disk used in selling cigars of twenty-five cents each, or five times the price of the cheapest cigar sold by the machine. Fig. 10 is a detail section, in the diametrical line of one of the stop-disks, showing the gear on the same axis and the manner of detachably connecting said gear to the disk. Fig. 11 is a detail perspective of part of one of the coin-receiving trays. Fig. 12 is a detail section showing one of the coin-tripped locking-devices, used in connection with each coin-receiving tray. Fig. 13 is a detail end elevation of the lower portion of the machine, showing the receiver arranged beneath the delivery-chute.

The reference-numeral 1, in said drawings, indicates the machine-casing, which may be of wood, metal, or any other suitable material, and ornamented as individual preference may suggest. The general form of the casing may be considerably varied, but in the simplest construction it is substantially quadrangular, as shown in Figs. 1 and 2. The side walls of the casing have a forward projection at their lower ends, to form the lateral inclosure of a chamber containing the coin-receiving trays, as hereinafter described. The front wall of the casing is preferably formed partly of glass 2, and partly of wood, or other suitable material. Certain portions of the side-walls, or rear wall, either, or both, may also be made of glass, in order to facilitate the inspection of the officials of the Internal Revenue Bureau. In its rear, the casing is inclosed by an upper door 3, and a lower door 4, suitably hinged and locked, to enable the proprietor, or lessee, to have access to the interior, to renew the supply of cigars, change the grade and price, and adjust the mechanism to such changes, as well as to remove those coins which may find their way to the interior, as hereinafter explained.

Within the interior of the machine-casing, in rear of the front wall, is arranged a supporting frame, composed of two, converging members 5, having their upper ends connected by a horizontal portion 6. Rising above the ends of this horizontal member 6, are vertical supports 7, connected at their upper ends to a horizontal cross-head 8, extending from side to side of the casing, or nearly so.

In the lower portion of the casing are arranged two, similar, horizontal shafts 9 and 10, parallel with the side walls of the casing, their ends being journaled, or supported, in the converging members 5 of the frame, and in substantially similar supports 12, adjacent to and parallel with the rear wall. Upon these shafts are mounted the delivery-drums, or cylinders 13, each being of such diameter as to contain a series, preferably twelve in number, of circumferential pockets 14, lying substantially parallel with the axis of the drum, each being of such size as to readily receive and wholly contain a single cigar. The drums are duplicates and are placed close to the side walls of the casing, in which are formed openings 15. The delivery-chutes 16, mounted upon the exterior of the side walls, communicate with said openings, which are provided with inclined plates 17, extending inward and upward, partly beneath the drums and in position to receive the cigars, as they fall from the pockets in the drums. When deposited upon said plates they readily pass by gravity into the external chutes 16 and drop upon any suitable receptacle, such for example, as that shown in Fig. 13.

Each delivery drum is rotated by a spur pinion 18, fast upon the drum, or upon the shaft. With each spur-pinion a large spur-gear 19 has mesh, its shaft 20 having support at, or near the point where the member 5, of the frame unites with the horizontal portion 6, and in the corresponding portion of the rear supporting frame 12. Above the shaft 20 is a shaft 21, upon which is a pinion 22, meshing with the gear 19. The shaft 21 also carries a spur-gear 23, similar to the gear 19, and having mesh with a pinion 24, arranged above the gear 23. This pinion is upon a shaft 25 upon which is also placed a disk 26, loose upon the shaft, but rigidly connected to the pinion 24 by screws 26ª, by removing which the disk can be slipped and another substituted. Each of the disks 26 is provided with a certain number of stops 27, as described hereinafter, and constitutes a stop for the train of gearing with which the pinion 24 is connected. The train of gearing through which movement is communicated to the delivery drum upon either side is the same with the exception of a difference in the stop-disk, hereinafter explained. When organized in the manner shown, the spur-pinions 22 and 24 have twelve teeth, each, while the large spur-gears 19 and 23 have forty-eight teeth. The pinions 18, on the drum-shafts, each have eithteen teeth. It is evident that these numbers, and the size of the gears and pinions may be varied, provided the relative proportions are preserved and the number of pockets in the delivery-drums varied to correspond.

One of the delivery-drums may be so operated as to deliver cigars costing five cents each, and in this case the stop-disk 26 is provided with two stops 27, arranged diametrically opposite each other. The pinion 24, upon the same shaft, will therefore make one-half of a complete revolution at each release. This movement being transmitted to the spur-gear 23, and pinion 22, on the same shaft, is communicated through the spur-gear 19 to the pinion 18, which is revolved one twelfth of its circumference, thereby turning the delivery-drum just far enough to cause one of its twelve pockets to discharge a cigar. Operative movement is communicated to each train of gearing by means of a spring 28, coiled on the shaft 20, one end of the spring being made fast to the shaft and the other end secured to a bar 29. The spring is placed under tension by winding the spring up with a suitable key, a pawl and ratchet being provided to hold the shaft.

Pivoted upon a suitable axis 30, (Fig. 6,) is a bell-crank latch lever 31, one of its arms being arranged to cross the periphery of the stop-disk and engage the stops 27 on the disk 26. The other arm is provided with a finger 32, which lies in a slot, or prolonged opening 33, in the end of the lever 34, which is fulcrumed upon the edge of the slot-way or coin-chute 35. To the the upper end of said lever is pivotally attached a tripping lever 36, consisting of a bar arranged in a channel in the wall inclosing the chute 35, its upper end having a lug 37 which bears on the wall, while the other end lies normally a little within the chute and in the path of the edge of the coin, as it descends said chute. A lug 38, projecting from the back of the bar, or trip-lever 36, furnishes means of pivotal connection to the lever 34. A spring 39 preserves the parts in the normal position described. When a nickel is dropped into the slot, its descent in the coin chute drives the end of the trip-lever outward, swinging the lever 34 and drawing the latch-lever off the stop 27 on the disk 26. The disk being released, the train of gears moves until the next stop 27 on the disk is brought against the latch-lever, whereupon all motion ceases.

With the gearing proportioned as described, half a revolution of the stop-disk 26 carries the delivery drum far enough to deliver a cigar. When it is desired to dispose of cigars of a higher price, for example, ten cents, which is a multiple of the price of the five cent cigar, the same arrangement of parts may be employed, the only change being that 26 must have four stops 27, instead of two. The introduction of the first coin, therefore, will produce only a quarter revolution of the disk, and a second coin will be required in order to complete the operation and cause the delivery drum to drop a cigar. In like manner, if fifteen cent cigars are sold, the stop-disk will have six equi-distant stops 27, and three coins will be necessary in order to carry the stop-disk through one-half a revolution. By making the stop-disks interchangeable, the machine may be adjusted in a moment for the sale of cigars of any price which is a multiple of the coin which must be used with the machine. I have shown, in the present instance, two separate slot-ways, or coin-chutes, but it is evident that by multiplying the trains of gearing and coin-chutes, I may sell as many different priced cigars as required.

The coins, after passing out of the chutes 35, enter a narrow space 40, between the glass front and a plate 41, parallel therewith, the interval between the two being so narrow that the coins must descend therein edgewise. The plate 41 is provided with a number of pins 42, projecting from its face and arranged at such intervals and in such alternation, that the coin in descending, must constantly change its course, its ultimate position being determined by the number of pins struck and the angle at which such contact is made. As the plate 41 and pins 42 are co-extensive with the front of the machine the coin may land at any point between the side-walls. As it approaches the bottom of the plate, it passes between ribs, or guide-bars, 43, projecting from the face of the plate, between which are pivoted trapping fingers, consisting of a straight bar having on its lower end curved fingers 44, which project in opposite directions. These trapping devices are normally upright in the spaces between the guide-ribs 43, and being caught by the end of the pivoted trapping bar descend between the same and the adjacent guide-bar. Catching upon one of the curved fingers 44, (Fig. 5) the trapping device is tilted and the coin is dropped either into a tray 45, below, or, if the coin happens to go upon the opposite side of the trapping device, it drops through a trapping chute 46 (Fig. 11) at the rear end of the tray 45, and dropping down beneath the tray 45 strikes a lever 47, the hooked end 48 of which locks the tray 45, in an inclined position, as in Fig. 3. The tray being released by this trapped coin, it is dumped by the weight of the coins it contains and said coins drop into a trough 49 where they are accessible. The empty tray is weighted by a weight 50 so that it closes automatically, and is again locked by the lever 47. I have shown five of these trays, in the drawings, all pivoted upon a shaft 51 and inclosed beneath a glass top 52 which is securely locked. The number of trays may be varied in any manner, and the number and arrangement of the pins 42 may also be changed. With the arrangement shown, about one coin in thirty or more, will, on the average, be trapped, and of course any coins in the tray will be discharged. As the distribution by the pins is always unequal, some trays may contain more, and some less, and the coin trapped may dump the tray containing the largest, or the smallest number of coins, as it chances.

The cigars are sold from the box in which they are placed by the manufacturers. The end wall of the box is removed and the open end turned downward, the wall being inserted behind clips 53, on the side wall of the machine. Guides 54 are provided for the cigars to rest upon, a slight inclination being given to said guides so that the cigars will pass down into the pockets of the delivery drums.

The mechanism comprised within the casing is of extremely simple character, as the parts are largely duplicated. For example, the four gears 19 and 23 are alike, and the four pinions 22 and 24 are also similar, one to another. The two pinions 18 are identical in construction, as well as the two delivery drums. The stop-disks 26 differ only in respect to the number of stops 27 with which they are provided. Thus, if any of the parts are lost, or broken, they may easily be duplicated. Moreover, a single mechanism may be employed, at different times, to sell cigars of different quality and price, the sole change required being the removal of one stop-disk and the substitution of another having a greater, or less, number of stops. This change may be readily and quickly made by using an ordinary screw-driver, no mechanical skill, or experience being necessary.

What I claim is—

1. In a coin operated, cigar vending machine, the combination with one or more coin-chutes of a series of pivoted coin-receptacles, independent, coin-tripped levers holding the receptacles when overbalanced by the coins deposited, a coin-distributing plate rising vertically at the rear-ends of said receptacles and having pins projecting at intervals from its face toward a transparent plate, a series of rigid guides between the adjacent receptacles, and pivoted trapping-fingers between the guides, each receptacle being provided with a trapping chute at its end, over the coin-tripped lever holding said receptacle, substantially as described.

2. In a coin-operated, cigar-vending machine, the combination with one or more coin-chutes, of a series of independently pivoted, coin-trays having weights which normally support them, when empty, in position to receive the coin, coin-tripped levers supporting said trays when loaded, a coin-distributing plate rising in rear of said trays and having pins projecting from it toward a transparent plate removed a distance slightly in excess of the thickness of the coins, a series of guide-ribs mounted on said plate between the trays rising above the latter and trapping fingers pivoted between the ribs and having curved ends extended in opposite directions, one being over a trapping chute which conducts the coin descending at that point upon the lever supporting the coin-tray, substantially as described.

3. In a coin operated, cigar-vending machine, the combination with a delivery-drum having pockets for the cigars and provided with a shaft having a pinion toothed, in proportion to the number of pockets, as three to two, of a gear meshing said pinion and toothed in the proportion of eight to three, relatively to said pinion, a pinion meshing the gear and toothed relatively thereto as two to eight, a second and similar gear on the pinion shaft, a pinion on a separate shaft having a ratio to the gear, with which it meshes, of two to eight, an interchangeable stop-disk on the shaft of the latter pinion having equi-distant stops the number of which is double the number of coins to be deposited, and coin-operated tripping-levers to release the disks, substantially as described.

In testimony whereof I have hereunto set my hand and affixed my seal in presence of two subscribing witnesses.

H. L. KIRTLEY. [L. S.]

Witnesses:
JAMES L. NORRIS,
J. HARVEY THORNBURG.